US012726790B2

(12) United States Patent
Lan et al.

(10) Patent No.: US 12,726,790 B2
(45) Date of Patent: Sep. 1, 2026

(54) INTERACTIVE APPARATUS POSITIONING SYSTEM AND METHOD FOR PROVIDING INTERACTIVE FUNCTIONS BASED ON THE CONFIRMED LOCATION OF THE INTERACTIVE APPARATUS

(71) Applicants: HON HAI PRECISION INDUSTRY CO., LTD., New Taipei City (TW); Foxconn Technology Group Co., Ltd., Guangdong Province (CN)

(72) Inventors: Tzu-Hsiang Lan, New Taipei City (TW); Jing-Kai Huang, New Taipei City (TW)

(73) Assignees: HON HAI PRECISION INDUSTRY CO., LTD., New Taipei City (TW); Foxconn Technology Group Co., Ltd., Guangdong Province (CN)

( * ) Notice: Subject to any disclaimer, the term of this patent is extended or adjusted under 35 U.S.C. 154(b) by 234 days.

(21) Appl. No.: 18/804,152

(22) Filed: Aug. 14, 2024

(65) Prior Publication Data

US 2025/0063325 A1 Feb. 20, 2025

(30) Foreign Application Priority Data

Aug. 14, 2023 (TW) ................................ 112130524

(51) Int. Cl.

| | |
|---|---|
| ***H04W 4/02*** | (2018.01) |
| ***G06F 3/01*** | (2006.01) |
| ***H04L 9/40*** | (2022.01) |

(52) U.S. Cl.

CPC ............. *H04W 4/025* (2013.01); *G06F 3/011* (2013.01); *H04L 63/0435* (2013.01); *H04L 63/0823* (2013.01)

(58) Field of Classification Search

None

See application file for complete search history.

(56) References Cited

U.S. PATENT DOCUMENTS

| | | | |
|---|---|---|---|
| 8,736,636 | B2 | 5/2014 | Kang et al. |
| 9,262,771 | B1 | 2/2016 | Patel |

(Continued)

FOREIGN PATENT DOCUMENTS

| | | | |
|---|---|---|---|
| CN | 107767579 | A | 3/2018 |
| CN | 107784539 | A | 3/2018 |

(Continued)

OTHER PUBLICATIONS

Michael Martin, et al., "Environmental assessment of a product-service system for renting electric-powered tools." Journal of Cleaner Production 281 (2021): 125245. (Year: 2021).

(Continued)

*Primary Examiner* — Rafael Pérez-Gutiérrez

(74) *Attorney, Agent, or Firm* — CKC & Partners Co., LLC

(57) ABSTRACT

An interactive apparatus positioning system includes an interactive apparatus and a server. In response to an interactive apparatus information corresponding to a terminal device information, the server is configured to transmit an encrypted certificate to the interactive apparatus and transmit a key corresponding to the encrypted certificate to the terminal device. In response to the interactive apparatus being in an activated state, the interactive apparatus is configured to transmit the encrypted certificate to the terminal device. The server is configured to receive a location information corresponding to the terminal device from the terminal device to locate the interactive apparatus, wherein the location information is transmitted in response to the terminal device receiving the encrypted certificate and (Continued)

obtaining a decrypted certificate by decrypting the encrypted certificate with the key.

18 Claims, 8 Drawing Sheets

(56) References Cited

U.S. PATENT DOCUMENTS

| | | | |
|---|---|---|---|
| 2003/0104865 | A1 | 6/2003 | Yuriltkis et al. |
| 2012/0264375 | A1 | 10/2012 | Shankaranarayanan |
| 2013/0282465 | A1 | 10/2013 | Fitzhugh et al. |
| 2016/0112418 | A1 | 4/2016 | Lu |
| 2016/0328698 | A1 | 11/2016 | Kumaraguruparan et al. |
| 2017/0103629 | A1 | 4/2017 | Chau |
| 2018/0123645 | A1 | 5/2018 | Jang |
| 2018/0285967 | A1 | 10/2018 | Gilbey et al. |
| 2019/0108578 | A1 | 4/2019 | Spivack et al. |
| 2019/0175076 | A1 | 6/2019 | Lustig et al. |
| 2019/0188450 | A1 | 6/2019 | Spivack et al. |
| 2020/0034919 | A1 | 1/2020 | Qiu et al. |
| 2020/0272221 | A1 | 8/2020 | Foster et al. |
| 2021/0056553 | A1 | 2/2021 | Howard |
| 2021/0142395 | A1 | 5/2021 | Fujima et al. |
| 2021/0158434 | A1 | 5/2021 | Zhu |
| 2021/0304555 | A1 | 9/2021 | Taylor et al. |
| 2021/0334892 | A1 | 10/2021 | Liu et al. |
| 2021/0358226 | A1 | 11/2021 | Rizvi et al. |
| 2023/0153776 | A1 | 5/2023 | Sherif et al. |
| 2023/0259985 | A1 | 8/2023 | Mcguinness et al. |
| 2024/0221451 | A1 | 7/2024 | David et al. |
| 2024/0422131 | A1 | 12/2024 | Guthridgge et al. |
| 2025/0061478 | A1* | 2/2025 | Lan .................... G06Q 30/0224 |
| 2025/0061510 | A1* | 2/2025 | Lan .......................... G06F 21/44 |
| 2025/0225227 | A1* | 7/2025 | Wang ...................... G06F 21/44 |
| 2026/0067677 | A1* | 3/2026 | Xiong ................... H04W 12/02 |

FOREIGN PATENT DOCUMENTS

| | | | |
|---|---|---|---|
| CN | 108446400 | A | 8/2018 |
| CN | 110033564 | A | 7/2019 |
| CN | 110908519 | A | 3/2020 |
| CN | 111340979 | A | 6/2020 |
| CN | 111540129 | B | 10/2020 |
| CN | 113849778 | A | 12/2021 |
| CN | 114219568 | A | 3/2022 |
| CN | 114237390 | A | 3/2022 |
| CN | 115210117 | A | 10/2022 |
| TW | 201322160 | A | 6/2013 |
| TW | 1620430 | B | 4/2018 |
| TW | 1653904 | B | 3/2019 |
| TW | 202247058 | A | 12/2022 |

OTHER PUBLICATIONS

Rasika Naik, et al., "Smart and secure locker system", Proceedings of the 3rd International Conference on Advances in Science & Technology (ICAST), 2020.

* cited by examiner

INTERACTIVE APPARATUS POSITIONING SYSTEM AND METHOD FOR PROVIDING INTERACTIVE FUNCTIONS BASED ON THE CONFIRMED LOCATION OF THE INTERACTIVE APPARATUS

CROSS-REFERENCE TO RELATED APPLICATION

This application claims priority to Taiwan Application Serial Number 112130524, filed Aug. 14, 2023, which is herein incorporated by reference in its entirety.

BACKGROUND

Field of Invention

The present disclosure relates to a positioning system and method. More particularly, the present disclosure relates to a positioning system and method for interactive apparatuses.

Description of Related Art

Interactive apparatuses (e.g., augmented reality glasses) can be applied to scenic spots, museums, art galleries and other fields and provide users with immersive experiences. However, for different application fields, the required specifications of the interactive apparatuses and the interactive content provided by the interactive apparatuses are different.

Therefore, rental services for interactive devices are provided by many venues. Through interactive apparatuses with unified specifications and preloaded content, users can be provided with a stable quality interactive experience.

However, in order to prevent the interactive apparatus from being lost or to provide interactive functions based on the location of the interactive apparatus, the location of the interactive apparatus needs to be confirmed while it is rented.

In view of this, how to provide an interactive apparatus rental service is the goal that the industry strives to work on.

SUMMARY

The disclosure provides an interactive apparatus positioning system. The interactive apparatus positioning system comprises a first interactive apparatus and a server. The first interactive apparatus is communicatively connected to a first terminal device. The server is communicatively connected to the first interactive apparatus and the first terminal device. The interactive apparatus positioning system is configured to execute the following operations: the first interactive apparatus transmitting an interactive apparatus information to the server; the server receiving a first terminal device information from the first terminal device; in response to the interactive apparatus information corresponding to the first terminal device information, the server transmitting an encrypted certificate to the first interactive apparatus, and transmitting, by the server, a key corresponding to the encrypted certificate to the first terminal device; in response to the first interactive apparatus being in an activated state, the first interactive apparatus transmitting the encrypted certificate to the first terminal device; and the server receiving a first location information corresponding to the first terminal device from the first terminal device to locate the first interactive apparatus, wherein the first location information is transmitted in response to the first terminal device receiving the encrypted certificate and obtaining a decrypted certificate by decrypting the encrypted certificate with the key.

The disclosure further provides an interactive apparatus positioning method. The interactive apparatus positioning method is adapted for use in an interactive apparatus positioning system, wherein the interactive apparatus positioning system comprises a first interactive apparatus and a server, the first interactive apparatus communicatively connects to a first terminal device, and the server communicatively connects to the first interactive apparatus and the first terminal device. The interactive apparatus positioning method comprises the following steps: the first interactive apparatus transmitting an interactive apparatus information to the server; the server receiving a first terminal device information from the first terminal device; in response to the interactive apparatus information corresponding to the first terminal device information, the server transmitting an encrypted certificate to the first interactive apparatus, and the server transmitting a key corresponding to the encrypted certificate to the first terminal device; in response to the first interactive apparatus being in an activated state, the first interactive apparatus transmitting the encrypted certificate to the first terminal device; and the server receiving a first location information corresponding to the first terminal device from the first terminal device to locate the first interactive apparatus, wherein the first location information is transmitted in response to the first terminal device receiving the encrypted certificate and obtaining a decrypted certificate by decrypting the encrypted certificate with the key.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
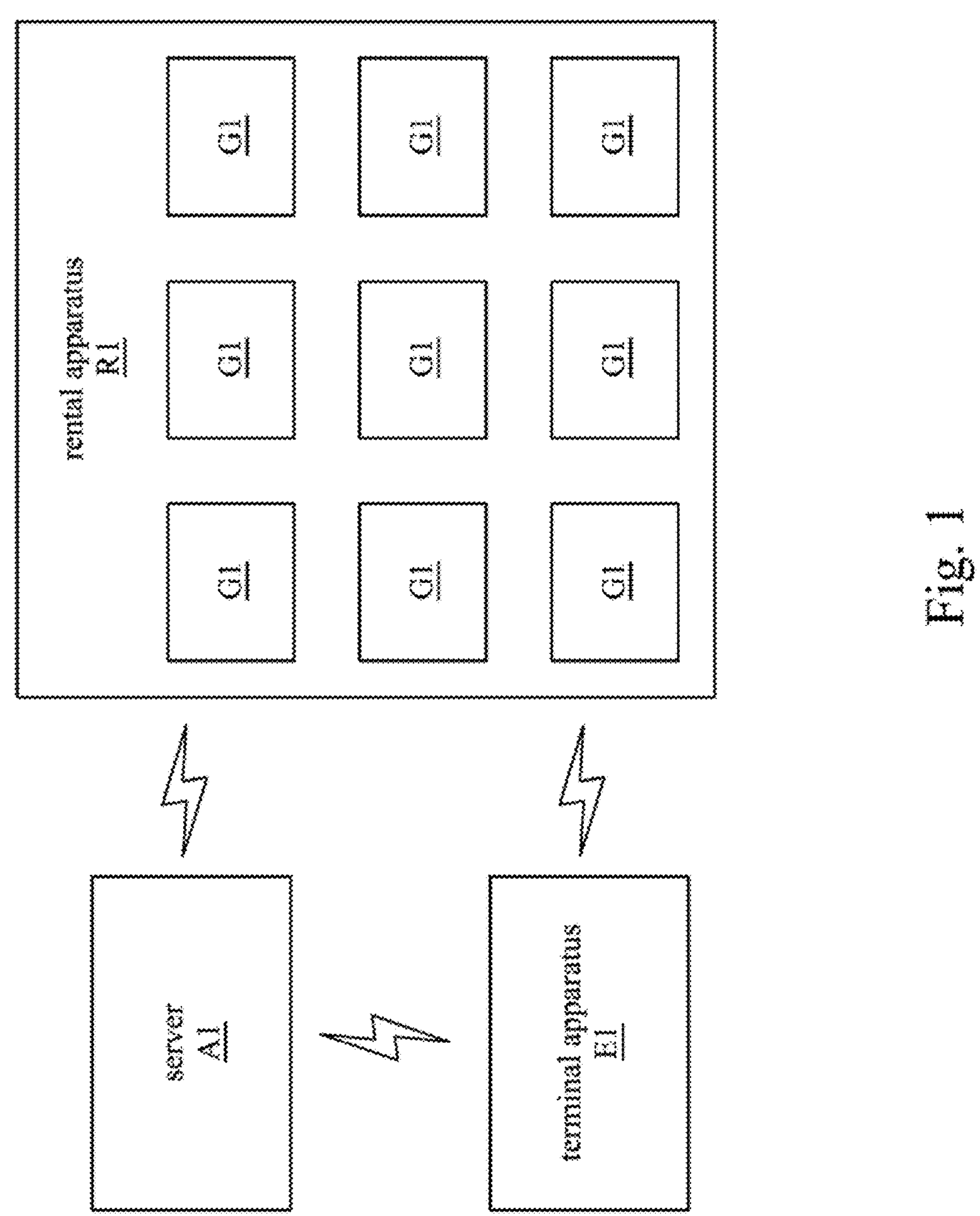
FIG. 1 is a schematic diagram illustrating an interactive apparatus rental system communicatively connected to a terminal device according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1, which is a schematic diagram illustrating an interactive apparatus rental system 1 communicatively connected to a terminal device E1 according to a first embodiment of the present disclosure. The interactive apparatus rental system 1 is configured to provide rental services for interactive apparatuses G1. The interactive apparatus rental system 1 comprises the interactive apparatuses G1, a rental apparatus R1, and a server A1, wherein the rental apparatus R1 and the server A1 communicatively connect to the terminal device E1 respectively, and the rental apparatus R1 and the server A1 are communicatively connected to each other. Also, the server A1 communicatively connects to the interactive apparatuses G1 respectively, e.g., when one of the interactive apparatuses G1 is activated, the server A1 communicatively connects to the one of the interactive apparatuses G1. The rental apparatus is configured to accommodate the interactive apparatuses G1. The interactive apparatuses G1 correspond to multiple serial numbers (e.g., each of the interactive apparatuses G1 corresponds to a unique number to identify each of the interactive apparatuses G1), and each of the interactive apparatuses G1 comprises a display. In some embodiments, the terminal device E1 is a smart phone. In some embodiments, the server A1 is an internet server.

In some embodiments, the interactive apparatuses G1 are augmented reality glasses. When a user wears the interactive apparatuses G1, they are able to interact with objects in a specific scene based on interactive contents stored in the interactive apparatuses G1. For example, since the interactive apparatuses G1 store introductions of the exhibits in a museum (i.e., interactive contents), when the user wears the interactive apparatuses G1 and looks at the exhibits, not only the appearance of the exhibits can be seen, but also the introduction information of the exhibits is provided by the interactive apparatuses G1. Additionally, the displays of the interactive apparatuses G1 are image-providing devices in the augmented reality glasses, such as a device assembly or system that mainly consists of a display device and an optical projection device. The displays can image on the user's retina, and the images look like to be projected on a virtual display surface, thereby allowing the user to view real-world images and interactive contents at the same time.

Besides, the interactive apparatuses G1 also comprise communication interfaces to communicatively connect to other devices, such as cellular network interfaces and Bluetooth interfaces. In some embodiments, the interactive apparatuses G1 are able to communicatively connect the terminal device E1 via low-power wide-area network (LPWAN) (e.g., Bluetooth low energy (BLE), Zigbee, Long Range (LoRa)). In some embodiments, the interactive apparatuses G1 are able to communicatively connect the server A1 via the cellular network interfaces.

In some embodiments, when the interactive apparatuses G1 need to transmit data to the server A1, the interactive apparatuses G1 transmit the data to the terminal device E1 via low-power wide-area network with relatively low power consumption, and then the terminal device E1 transmit the data to the server A1 via the cellular network. Accordingly, compare to transmitting data to the server A1 via the cellular network directly, the interactive apparatuses G1 can reduce power consumption while transmitting data to the server A1.

In some embodiments, the interactive apparatuses G1 also comprise cameras configured to capture images. Accordingly, the interactive apparatuses G1 is able to detect movements of the user, e.g., touching specific objects and posing specific gestures, and the user is able to operate the cameras manually to capture images.

Figure 2:
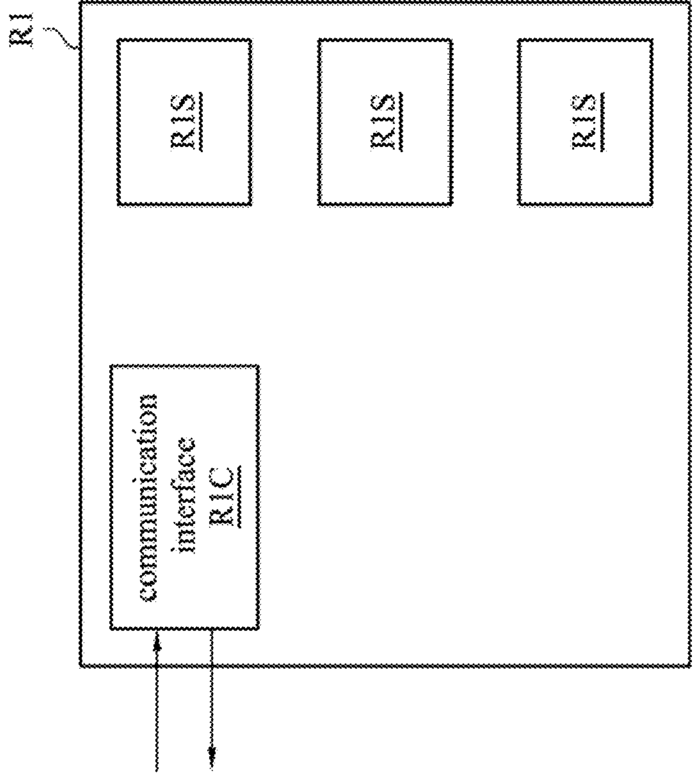
FIG. 2 is a schematic diagram illustrating a rental apparatus according to the first embodiment of the present disclosure.

About the details of the rental apparatus R1, please refer to FIG. 2, which is a schematic diagram illustrating a rental apparatus R1 according to the first embodiment of the present disclosure. As shown in FIG. 2, the rental apparatus R1 comprises a communication interface R1C and multiple cabinets R1S.

The communication interface R1C is configured to communicate with other devices and comprises one or more interface for different communication protocols, such as near-field communication (NFC) interface, Bluetooth interface, code scanner, Ethernet interface, Wi-Fi interface, and/or other communication interfaces.

The cabinets RIS are configured to accommodate the interactive apparatuses G1, each of the cabinets RIS comprises a cabinet door that can be locked. Accordingly, the rental apparatus R1 is able to control whether to lock the cabinet door to make the interactive apparatuses G1 to be locked in the rental apparatus R1 or able to be taken out from the rental apparatus R1. The cabinets RIS may also comprise connection interfaces to couple the interactive apparatuses G1, the connection interfaces are configured to charge the interactive apparatuses G1 and/or transmit data with the interactive apparatuses G1. In some embodiments, each of the cabinets RIS accommodates one of the interactive apparatuses G1.

It is noticed that, the aforementioned embodiment illustrates one of the implementations of the present disclosure, and the present disclosure is not limited to the aforementioned embodiment. In other embodiments, the rental apparatus R1 may also accommodate and/or lock the interactive apparatuses G1 in other way. For example, the rental apparatus R1 comprises multiple connection ports (e.g., slots, cables), the interactive apparatuses G1 may couple to the connection ports to let the rental apparatus R1 charge the interactive apparatuses G1 and/or transmit data with the interactive apparatuses G1, and the connection ports also comprise a locking mechanism configured to lock the interactive apparatuses G1 from being taken from the rental apparatus R1. Besides, the number of the cabinets RIS may be determined as needed and is not limited by the present disclosure.

About the operations of the interactive apparatus rental system 1 providing interactive apparatus rental services, please refer to the following paragraphs.

First, the server A1 of the interactive apparatus rental system 1 receives a renter data from the rental apparatus R1, wherein the renter data is generated by the rental apparatus R1 in response to a rental request transmitted by a terminal device E1.

In some embodiments, the interactive apparatus rental system 1 provides an application for the user to register as a member and login to an account on the application via the terminal device E1, and the member data provided by the user in the registration (e.g., name, contact) is stored in the server A1.

Furthermore, the user may operate the application via the terminal device E1 to transmit the rental request to the rental apparatus R1. For example, the terminal device E1 displays a barcode for the communication interface R1C of the rental apparatus R1 to scan, or the terminal device E1 transmits the rental request to the communication interface R1C via near-field communication. The rental request comprises an identification of the user (e.g., user ID) configured to make the rental apparatus R1 to confirm the user identity corresponding to the terminal device E1.

In response to receiving the rental request, the rental apparatus R1 transmits the corresponding renter data based on the rental request to the server A1, wherein the renter data may comprise the identification of the user (e.g., user ID).

Next, the server A1 selects a first interactive apparatus from the interactive apparatuses G1 to generate a an unlock command, wherein the unlock command comprises a first serial number corresponding to the first interactive apparatus.

In some embodiments, after receiving the renter data, the server A1 determines whether the member data of the renter data exists in the member data stored in the server A1. If the member data exists, the server A1 assigns the first interactive apparatus of the interactive apparatuses G1 in the rental apparatus R1 to the user corresponding to the renter data and generates the unlock command comprising the first serial number corresponding to the first interactive apparatus. In contrast, if the member data does not exist, the server A1 does not assign the interactive apparatuses to the user. Furthermore, the server A1 transmits the unlock command to the rental apparatus R1.

Next, in response to receiving the unlock command, the rental apparatus R1 unlocks the first interactive apparatus.

Specifically, after receiving the unlock command, the rental apparatus R1 unlocks the first interactive apparatus (e.g., unlocking the cabinet RIS accommodating the first interactive apparatus) corresponding to the first serial number of the unlock command to provide the user to take out the first interactive apparatus.

Finally, the server A1 authenticates the first interactive apparatus and the terminal device E1 to activate an interactive function of the first interactive apparatus.

After the first interactive apparatus is taken, the server A1 further authenticates whether the first interactive apparatus has been taken by the user corresponding to the terminal device E1 correctly. After the authentication succeeds, the first interactive apparatus may activate the interactive function for the user.

In some embodiments, the operation of the server A1 authenticating the first interactive apparatus and the terminal device E1 further comprises the following operations.

First, the first interactive apparatus provides an unauthenticated data through the display, wherein the unauthenticated information is generated by the server A1. In some embodiments, the server A1 generates the unauthenticated data, e.g., random generated text string or number. Next, the first interactive apparatus receives the unauthenticated data from the server A1. Furthermore, the first interactive apparatus notices the user to input the unauthenticated data into the terminal device E1 via the display.

Next, the server A1 receives an input data from the terminal device E1 to perform a pairing authentication, wherein the input data is generated by the terminal device E1 in response to an input operation of a user. After the user sees the notification on the display of the first interactive apparatus and inputs the corresponding information (e.g., the text string displayed on the screen) (i.e., the input data) into the terminal device E1, the terminal device E1 transmits the input data to the server A1.

Finally, in response to the input data matching the unauthenticated data, the server A1 controls the first interactive apparatus to activate the interactive function corresponding to the user. If the authenticated data received from the terminal device E1 matches the unauthenticated data, it means that the first interactive apparatus has been taken by the user corresponding to the terminal device E1 correctly. Furthermore, the first interactive apparatus may activate the interactive function for the user. In some embodiments, after receiving instruction from the server A1, the first interactive apparatus activates the interactive function corresponding to the user, e.g., providing age-appropriate interactive content based on the user's age.

It is noticed that, the operations of receiving the authenticated data, generating the unauthenticated data, and comparing the authenticated data and the unauthenticated data may be executed by any of the apparatuses of the interactive apparatus rental system 1. For example, the server A1 generates and transmits the unauthenticated data to the first interactive apparatus, and then after receiving the authenticated data and comparing the authenticated data and the unauthenticated data, the server A1 transmits the comparison result to the first interactive apparatus to make the first interactive apparatus activate the interactive function. Any apparatus of the interactive apparatus rental system 1 may complete the aforementioned operations and then transmit and receive data via the communicative connection between the apparatuses to enable the corresponding apparatus to obtain the required information (i.e., the first interactive apparatus obtaining the unauthenticated data and the comparison result) and complete the authentication.

In some embodiments, the interactive apparatuses G1 stores the interactive content for providing the interactive function, e.g., three-dimension models, images, texts. However, the storage of the interactive apparatuses G1 is limited. Therefore, in some embodiments, the server A1 receives a location data corresponding to the first interactive apparatus, generates an interactive content corresponding to the first interactive apparatus based on the location data, and transmits the interactive content to the first interactive apparatus. Additionally, in response to receiving the interactive content from the first interactive apparatus, the first interactive apparatus activates the interactive function corresponding to the interactive content. For example, the server A1 generates and transmits the corresponding interactive content (e.g., introduction of exhibits) to the first interactive apparatus based on the location of the first interactive apparatus (e.g., the exhibition area in a museum) to enable the first interactive apparatus to activate the corresponding interactive function (e.g., providing introduction of the exhibits in the exhibition area of the museum). Accordingly, the interactive apparatuses G1 does not have to store all of the interactive contents may be used and saves the storage of the interactive apparatuses G1.

In some embodiments, the first interactive apparatus transmits a location reporting signal to the terminal device E1, and after receiving location reporting signal, the terminal device E1 transmits the location data corresponding to the first interactive apparatus to the server A1. Accordingly, the first interactive apparatus does not need to transmit the location data to the server A1 by using communication method such as the cellular network and saves the power consumption of the first interactive apparatus.

In some embodiments, for recording rental behaviors, the server A1 stores the rental record (e.g., rental time, location) between the member data corresponding to the terminal device E1 and the serial number corresponding to the first interactive apparatus. Also, for binding the relationship between the terminal device E1 and the first interactive apparatus, when the server A1 selects the first interactive apparatus from the interactive apparatuses G1, the server A1 generates a rental certificate corresponding to the first interactive apparatus and the terminal device E1.

Next, the server A1 transmits the rental certificate to the terminal device E1 and the first interactive apparatus to make the terminal device E1 and the first interactive apparatus obtain the same rental certificate, thereby confirming the binding relationship between them. In some embodiments, the rental certificate is a hash value calculated based on the identification data of the terminal device E1 and the first interactive apparatus.

Furthermore, when the user finishes using the first interactive apparatus and returns the first interactive apparatus, the detailed operations of the interactive apparatus rental system 1 to provide a return service are illustrated below.

In some embodiments, return apparatus the interactive apparatus rental system 1 further comprises a return apparatus, wherein the return apparatus has the same functions and structure as the rental apparatus R1. Accordingly, if there are multiple rental apparatuses R1 configured in a venue, the user may choose any rental apparatus R1 as the return apparatus to return the first interactive apparatus and does not need to get back to the rental apparatus R1 where the first interactive apparatus was taken previously. For clarity, the detail of the functions and structure of the rental apparatus will not be repeated, and the following description of the return service operation will take the rental apparatus R1 as the return apparatus for illustration.

First, the user operates the terminal device E1 to activate the return operation (e.g., selecting the return option in the application), and the terminal device E1 transmits a return certificate to the server A1, wherein the return certificate corresponding to the rental certificate. In some embodiments, the return certificate is the same as the rental certificate. Accordingly, the server A1 is able to confirm that the first interactive apparatus the user wants to return.

In some embodiments, the user may also operate the application via the terminal device E1 to transmit a return request to the rental apparatus R1 (i.e., the return apparatus). For example, the terminal device E1 displays a barcode for the communication interface of the rental apparatus R1 to scan, or the terminal device E1 transmits the rental request to the communication interface via near-field communication. The return request comprises an identification of the user (e.g., user ID) configured to make the rental apparatus R1 to confirm the user identity corresponding to the terminal device E1. Furthermore, in response to receiving the return request from the terminal device E1, the rental apparatus R1 transmits the corresponding renter data to the server A1 based on the return request. Wherein the renter data comprises the identification of the user (e.g., user ID). Accordingly, the server A1 is able to confirm that the user corresponding to the terminal device E1 is at the location of the rental apparatus R1 to return the first interactive apparatus.

Next, the rental apparatus R1 (i.e., the return apparatus) may unlock the cabinet R1S with enough space to accommodate the interactive apparatus G1 to let the user place the first interactive apparatus and couple the first interactive apparatus to the connection port in the cabinet R1S. In response to the first interactive apparatus coupling to the return apparatus R1, the first interactive apparatus or the return apparatus R1 transmits the return certificate to the server A1. Specifically, after the user places the first interactive apparatus in the rental apparatus R1 and couples the first interactive apparatus to the connection port in the cabinet R1S, the rental apparatus R1 is able to confirm that the first interactive apparatus has already been placed in the specific cabinet R1S. Furthermore, the first interactive apparatus may transmit the return certificate to the server A1 directly, or the first interactive apparatus may also transmit the return certificate to the server A1 via the rental apparatus R1. Accordingly, the server A1 is able to confirm that the first interactive apparatus has been placed in the rental apparatus R1.

In some embodiments, in response to the first interactive apparatus coupling to the rental apparatus R1 (i.e., the return apparatus), the rental apparatus R1 locks the first interactive apparatus. For example, after the rental apparatus R1 locks the first interactive apparatus, the first interactive apparatus or the rental apparatus R1 transmits the return certificate to the server A1.

Finally, in response to receiving the return certificate from the terminal device E1 and receiving the return certificate from the first interactive apparatus or the rental apparatus R1 (e.g., the return apparatus), the server A1 transmits a return signal to the terminal device E1 and the rental apparatus R1. Since the server A1 receives the return certificate form the terminal device E1 and the first interactive apparatus or the rental apparatus R1 (in some embodiments, the server A1 also receives the renter data from the return apparatus), the server A1 is able to confirm that the user corresponding to the terminal device E1 wants to return the first interactive apparatus and the first interactive apparatus has been placed in the rental apparatus R1. Therefore, the server A1 confirms that the return operation is completed and transmits the return signal to the terminal device E1 and the rental apparatus R1 to also make the terminal device E1 and the rental apparatus R1 to confirm that the return operation is completed.

Figure 3:
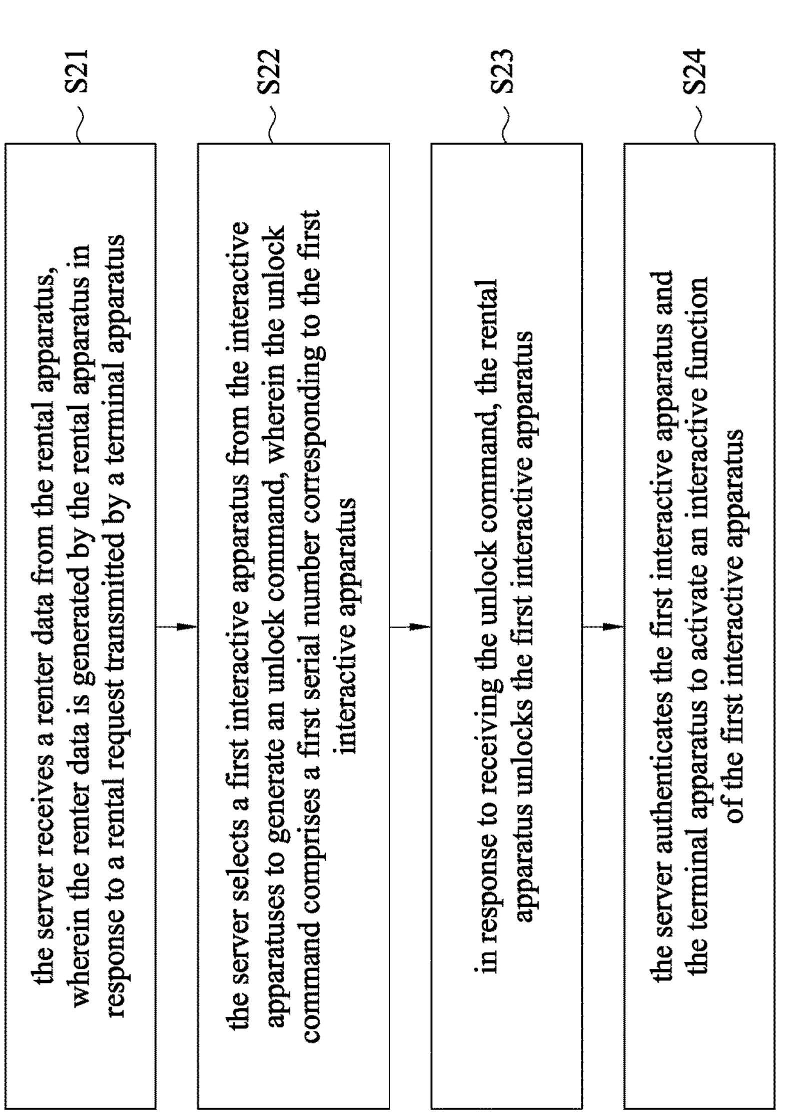
FIG. 3 is a flow diagram illustrating an interactive apparatus rental method according to a second embodiment of the present disclosure.

Please further refer to FIG. 3, which is a flow diagram illustrating an interactive apparatus rental method 2 according to a second embodiment of the present disclosure. The interactive apparatus rental method 2 comprises steps S21-S24. The interactive apparatus rental method 2 is adapted for use in an interactive apparatus rental system (e.g., the interactive apparatus rental system 1). The interactive apparatus rental system comprises a rental apparatus (e.g., the rental apparatus R1), and a server (e.g., the server A1), wherein the rental apparatus and the server communicatively connect to the terminal device respectively, the server communicatively connects to the rental apparatus. The rental apparatus accommodates a plurality of interactive apparatuses corresponding to a plurality of serial numbers, wherein each of the interactive apparatuses comprises a display.

In the step S21, the server receives a renter data from the rental apparatus, wherein the renter data is generated by the rental apparatus in response to a rental request transmitted by a terminal device.

In the step S22, the server selects a first interactive apparatus from the interactive apparatuses to generate an unlock command, wherein the unlock command comprises a first serial number corresponding to the first interactive apparatus.

In the step S23, in response to receiving the unlock command, the rental apparatus unlocks the first interactive apparatus.

In the step S24, the server authenticates the first interactive apparatus and the terminal device to activate an interactive function of the first interactive apparatus.

In some embodiments, the step S24 further comprises the first interactive apparatus providing unauthenticated data through the display, wherein the unauthenticated information is generated by the server; the server receiving an input data from the terminal device to perform a pairing authentication, wherein the input data is generated by the terminal device in response to an input operation of a user; and in response to the input data matching the unauthenticated data, the server controlling the first interactive apparatus to activate the interactive function corresponding to the user.

In some embodiments, the interactive apparatus rental method 2 further comprises the server receiving a location data corresponding to the first interactive apparatus; the server generating an interactive content corresponding to the first interactive apparatus based on the location data; and in response to the first interactive apparatus receiving the interactive content, the first interactive apparatus activating the interactive function corresponding to the interactive content.

In some embodiments, the location data is generated by the terminal device in response to a location reporting signal from the first interactive apparatus, and the location data of the first interactive apparatus is transmitted to the server by the terminal device.

In some embodiments, the interactive apparatus rental system further comprises a return apparatus (e.g., the return apparatus in the first embodiment), and the interactive apparatus rental method 2 further comprises the server selecting the first interactive apparatus from the interactive apparatuses to generate a rental certificate corresponding to the first interactive apparatus and the terminal device; the server transmitting the rental certificate to the terminal device and the first interactive apparatus; the server receiving a return certificate from the terminal device, wherein the return certificate corresponds to the rental certificate; in response to the first interactive apparatus coupling to the return apparatus, the first interactive apparatus or the return apparatus transmitting the return certificate to the server; and in response to receiving the return certificate from the terminal device and receiving the return certificate from the first interactive apparatus or the return apparatus, the server transmitting a return signal to the terminal device and the return apparatus.

In some embodiments, the interactive apparatus rental method 2 further comprises the server receiving the renter data from the return apparatus, wherein the renter data is generated by the return apparatus in response to a return request transmitted by the terminal device.

In some embodiments, the interactive apparatus rental method 2 further comprises in response to the first interactive apparatus coupling to the return apparatus, the return apparatus locking the first interactive apparatus.

In some embodiments, the rental apparatus further comprises a plurality of cabinets, the cabinets are configured to accommodate the interactive apparatuses, and the rental apparatus unlocks the first interactive apparatus through one of the cabinets.

In summary, the interactive apparatus rental system and method in the present disclosure perform multi-parties authentications through operations between the server, the rental apparatus, the return apparatus, the interactive apparatuses, and the terminal device and complete the interactive apparatus rental operation to provide the user interactive apparatus rental services. Additionally, the interactive apparatus rental system and method in the present disclosure also generate corresponding interactive contents based on different information (e.g., location, user identity) to improve the service quality of the interactive apparatuses. Since the interactive apparatus rental system and method in the present disclosure complete rental operations automatically by multiple apparatuses without manual operation and improves the efficiency of the rental operations. Furthermore, the interactive apparatus rental system and method in the present disclosure provide the user the service of returning the interactive apparatuses.

Figure 4:
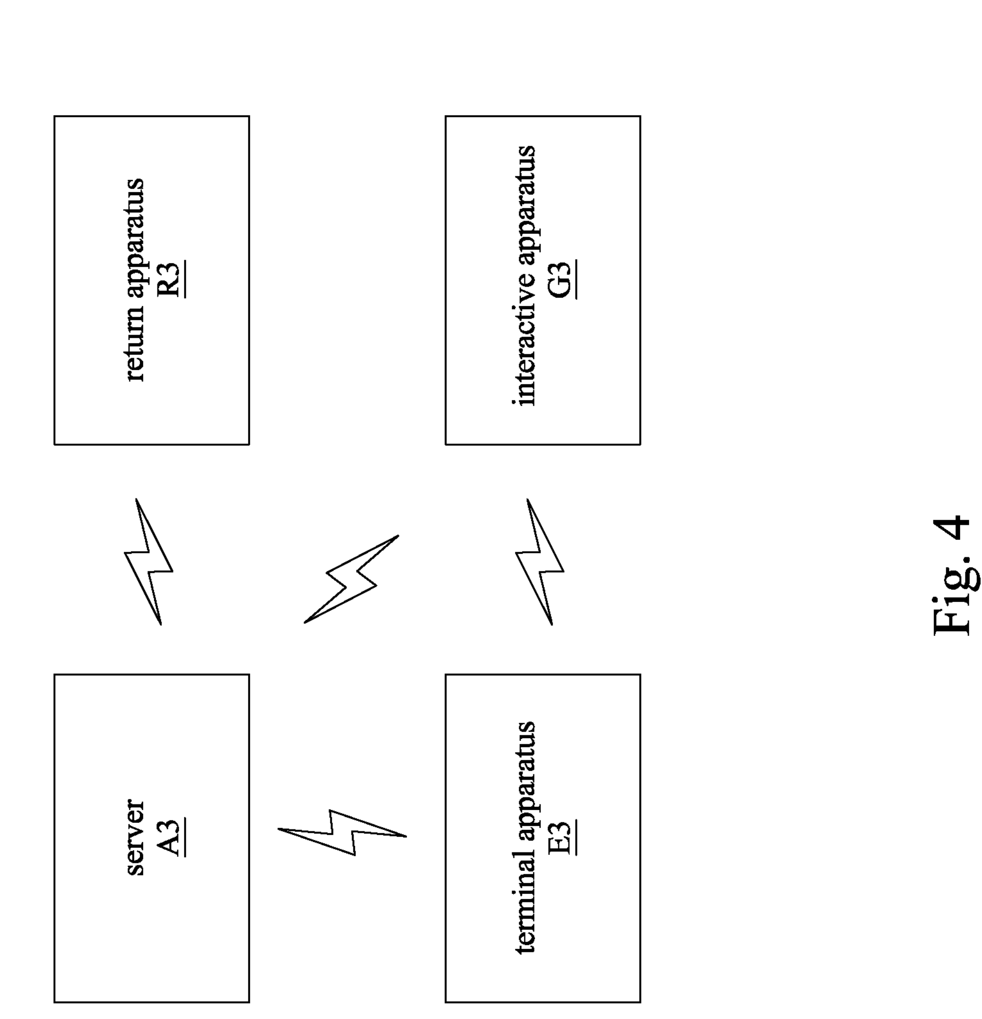
FIG. 4 is a schematic diagram illustrating a virtual reward distribution system communicatively connected to a terminal device according to a third embodiment of the present disclosure.

Please refer to FIG. 4, which is a schematic diagram illustrating a virtual reward distribution system 3 communicatively connected to a terminal device E3 according to a third embodiment of the present disclosure. The virtual reward distribution system 3 comprises a server A3, a return apparatus R3, and an interactive apparatus G3. The server A3 communicatively connects to the terminal device E3, the return apparatus R3 communicatively connects to the server A3, the interactive apparatus G3 communicatively connects to the server A3 and the terminal device E3, and the interactive apparatus G3 stores a plurality of reward conditions and a reward certificate corresponding to each of the reward conditions.

In some embodiments, the reward conditions are conditions corresponding to operation inputs of the user, e.g., the user posing specific gestures, touching specific objects, or capturing images of specific objects. On the other hand, the reward certificates are certificates corresponding to the reward conditions, e.g., when the user poses specific gestures (i.e., matching the reward conditions), the virtual reward distribution system 3 will distribute the corresponding reward certificate to the user.

In some embodiments, the reward certificates are stored in the interactive apparatus G3 after encrypted and able to avoid the user from obtaining the reward by reading the reward certificates directly without matching the reward conditions.

In some embodiments, the interactive apparatus G3 may be the interactive apparatus G1 in the first embodiment; the server A3 may be the server A1 in the first embodiment; the return apparatus R3 may be the return apparatus R1 or the return apparatus in the first embodiment; and the terminal device E3 may be the terminal device E1 in the first embodiment.

In some embodiments, the server A3 stores a plurality of virtual objects corresponding to a physical location, e.g., a virtual exhibit label (i.e., the virtual object) for introduction in an exhibition area of a museum (i.e., the physical location). Furthermore, the server A3 selects at least one first virtual object from the virtual objects; and the server A3 generates the reward conditions corresponding to the at least one first virtual object and the reward certificate of each of the reward conditions based on the at least one first virtual object. For example, the server A3 generates the reward conditions and the reward certificates corresponding to the virtual objects in an augmented reality, e.g., if the user waves hand to a virtual character, the user will obtain rewards. Accordingly, the virtual reward distribution system 3 combines the interactive functions and the reward system to improve the interactive experience for the user.

By using the virtual reward distribution system 3, the user may collect rewards by meeting certain conditions (e.g., completing a specific operation) while using the interactive apparatus G3, and the user obtains the rewards (e.g., virtual loots, coupons) after finishing using the interactive apparatus G3. About the operations of the virtual reward distribution system 3 providing the virtual reward distribution service, please refer to the following paragraphs.

First, the interactive apparatus G3 determines whether an input operation of the user matches a first reward condition of the reward conditions.

Specifically, when the user operates the interactive apparatus G3, the interactive apparatus G3 records the operation of the user. In some embodiments, the interactive apparatus G3 comprises a camera configured to capture images, and the interactive apparatus G3 determines whether the input operation of the user matches one of the reward conditions based on the images captured. For example, the interactive apparatus G3 detects the position and gesture of the user's hand (i.e., the input operation) and determines whether the position and gesture of the user's hand matches one of the reward conditions.

In some embodiments, the interactive apparatus G3 is rented and authenticated as the operations or the steps in the aforementioned first embodiment or second embodiment, and the interactive apparatus G3 is switched to an activated state for the user. Afterwards, the interactive apparatus G3 then receives the input operation from the user.

Next, in response to determining that the input operation matches the first reward condition, the interactive apparatus G3 selects a first reward certificate corresponding to the reward conditions from the reward certificates.

In some embodiments, the interactive apparatus G3 stores the reward certificates and the corresponding reward conditions. The reward conditions are conditions detected and determined by the interactive apparatus G3, e.g., the image captured by the user comprises specific object (e.g., exhibit, landmark) or specific gesture posed by the user.

In some embodiments, when the virtual reward distribution system 3 needs to update the reward certificates and the corresponding reward conditions stored in the interactive apparatus G3, the server A3 transmits an updated reward certificate and an updated reward condition to the interactive apparatus G3 to update the reward certificates and the corresponding reward conditions stored in the interactive apparatus G3.

In some embodiments, the server A3 transmits an updated reward certificate and an updated reward condition to the interactive apparatus G3 to update the reward certificates and the reward conditions based on a location data of the interactive apparatus G3. For example, since the storage is limited, of the interactive apparatus G3 only stores the reward certificates and the reward conditions of an exhibition area A (e.g., the certificates obtained and the corresponding conditions while the user interacting with objects in the exhibition area A). However, when the user and the interactive apparatus G3 move to an exhibition area B, the server A3 is able to transmit the reward certificates and the reward conditions corresponding to the exhibition area B based on the location of the interactive apparatus G3 (e.g., the certificates obtained and the corresponding conditions while the user interacting with objects in the exhibition area B).

The reward certificates represent rewards that the user may obtains when the interactive apparatus G3 determines that the corresponding reward condition is met. However, the user cannot obtain the reward before finishing using and returning the interactive apparatus G3. Therefore, the reward certificates are stored in the interactive apparatus G3 in an encrypted form, and after the user meets a reward condition, the interactive apparatus G3 transmits the first reward certificate corresponding to the reward condition to the server A3.

In some embodiments, the interactive apparatus G3 transmits the first reward certificate to the terminal device E3, and then the terminal device E3 transmits the first reward certificate to the server A3. In some embodiments, the interactive apparatus G3 transmits the rental certificate corresponding to the user and the first reward certificate to the terminal device E3. Furthermore, the terminal device E3 determines whether the rental certificate corresponds to the terminal device E3. If the rental certificate corresponds to the terminal device E3, it is indicated that the first reward certificate is obtained by the user corresponding to the rental certificate. Therefore, in response to the rental certificate corresponding to the terminal device E3, the terminal device E3 transmits the first reward certificate to the server A3. It is noticed that, the aforementioned rental certificate may be the rental certificate in the first embodiment configured to confirm the relationship between the user, the terminal device E3, and the interactive apparatus G3.

Next, the server A3 receives the first reward certificate selected by the interactive apparatus G3 to store into a user account. After receiving the first reward certificate, the server A3 is able to confirm that the user corresponding to the interactive apparatus G3 has obtained the reward corresponding to the first reward certificate. Therefore, the server A3 stores the first reward certificate to the user account. Accordingly, the reward obtained by the user is stored in the server A3 and cannot be used.

In some embodiments, when the interactive apparatus G3 is in an activated state, the server A3 does not unlock the first reward certificate. In other words, when the interactive apparatus G3 is in the activated state, the user cannot use the first reward certificate in the user account via the interactive apparatus G3 or the terminal device E3. Accordingly, the user could not obtain the reward while using the interactive apparatus G3.

In some embodiments, in addition to receiving the first reward certificate, the server A3 also receives the rental certificate transmitted by the interactive apparatus G3 to confirm the user account corresponding to the first reward certificate.

Next, in response to the return apparatus R3 determining that the interactive apparatus G3 is switched to a returned state, the return apparatus R3 transmits a rental certificate to the server A3. In some embodiments, the return apparatus R3 may determine that the interactive apparatus G3 has been returned through the operation of the return apparatus determining that the interactive apparatus G1 has been returned in the first embodiment. Furthermore, after the return apparatus R3 determines that the interactive apparatus G3 has been returned, the interactive apparatus G3 is switched to a returned state (e.g., the interactive apparatus G3 shuts down, the interactive apparatus G3 starts charging), and the return apparatus R3 transmits the rental certificate to the server A3.

In some embodiments, in response to the interactive apparatus G3 coupling to the return apparatus R3, the return apparatus R3 determines that the interactive apparatus G3 is switched to the returned state. Specifically, the interactive apparatus G3 may couples to the return apparatus R3 as mentioned in the first embodiment.

It is noticed that, the interactive apparatus G3 may constantly determine that whether the input operation of the user matches the reward conditions. When the input operation matches the reward conditions, the interactive apparatus G3 transmits the corresponding reward certificates again, and the server A3 stores the reward certificates into the user account accordingly.

Finally, the server A3 unlocks the reward certificates in the user account corresponding to the rental certificate based on the rental certificate to distribute a virtual reward corresponding to the reward certificates in the user account to the terminal device.

After receiving the rental certificate, the server A3 is able to confirm the interactive apparatus G3 has been returned, thereby unlocking the reward certificates stored in the user account and distributing the virtual rewards corresponding to the reward certificates to the terminal device E3, wherein the virtual rewards are rewards obtained by the user while using the interactive apparatus G3, and the virtual rewards are the certificates that can be provided to the user after decryption, e.g., virtual loots, coupons.

In some embodiments, when the reward certificates are stored in the user account in an encrypted form, after the interactive apparatus G3 has been determined as returned, the server A3 decrypts the reward certificates in the user account to obtain the virtual rewards.

Figure 5:
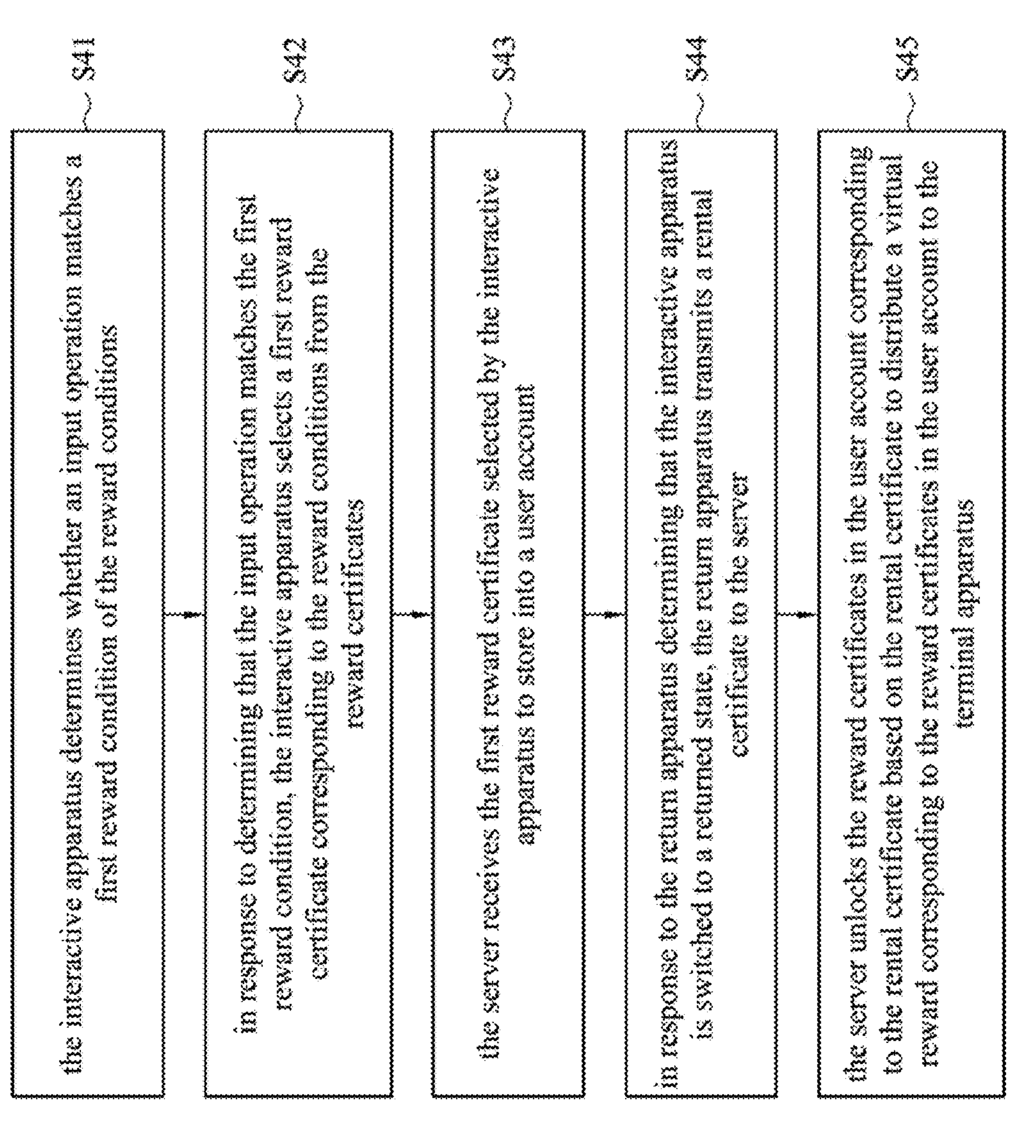
FIG. 5 is a flow diagram illustrating a virtual reward distribution method according to a fourth embodiment of the present disclosure.

Please further refer to FIG. 5, which is a flow diagram illustrating a virtual reward distribution method 4 according to a fourth embodiment of the present disclosure. The virtual reward distribution method 4 comprises steps S41-S45. The virtual reward distribution method 4 is adapted for use in a virtual reward distribution system (e.g., the virtual reward distribution system 3). The virtual reward distribution system comprises an interactive apparatus (e.g., the interactive apparatus G3), a return apparatus (the return apparatus R3), and a server (the server A3), wherein the server communicatively connects to a terminal device (the terminal device E3), the return apparatus communicatively connects to the server, the interactive apparatus communicatively connects to the server and the terminal device, and the interactive apparatus stores a plurality of reward conditions and an reward certificate corresponding to each of the reward conditions.

In the step S41, the interactive apparatus determines whether an input operation matches a first reward condition of the reward conditions.

In the step S42, in response to determining that the input operation matches the first reward condition, the interactive apparatus selects a first reward certificate corresponding to the reward conditions from the reward certificates.

In the step S43, the server receives the first reward certificate selected by the interactive apparatus to store into a user account.

In the step S44, in response to the return apparatus determining that the interactive apparatus is switched to a returned state, the return apparatus transmits a rental certificate to the server.

In the step S45, the server unlocks the reward certificates in the user account corresponding to the rental certificate based on the rental certificate to distribute a virtual reward corresponding to the reward certificates in the user account to the terminal device.

In some embodiments, the server stores a plurality of virtual objects corresponding to a physical location, and the virtual reward distribution method further comprises: selecting at least one first virtual object from the virtual objects; and generating the reward conditions corresponding to the at least one first virtual object and the reward certificate of each of the reward conditions based on the at least one first virtual object.

In some embodiments, the virtual reward distribution method 4 further comprises: in response to the interactive apparatus coupling to the return apparatus, the return apparatus determining that the interactive apparatus is switched to the returned state.

In some embodiments, the step S43 further comprises: the interactive apparatus transmitting the first reward certificate to the terminal device; and the terminal device transmitting the first reward certificate to the server.

In some embodiments, the step S43 further comprises: the interactive apparatus transmitting the rental certificate and the first reward certificate to the terminal device; and in response to the rental certificate corresponding to the terminal device, the terminal device transmitting the first reward certificate to the server.

In some embodiments, the virtual reward distribution method 4 further comprises: the server transmitting an updated reward certificate and an updated reward condition to the interactive apparatus to update the reward certificates and the reward conditions.

In some embodiments, the step of the server transmitting the updated reward certificate and the updated reward condition to the interactive apparatus further comprises: the server transmitting the updated reward certificate and the updated reward condition to the interactive apparatus based on a location data of the interactive apparatus to update the reward certificates and the reward conditions.

In some embodiments, the virtual reward distribution method 4 further comprises: in response to the interactive apparatus is in an activated state, the interactive apparatus receiving the input operation; and in response to the interactive apparatus is in the activated state, the server does not unlock the reward certificates in the user account corresponding to the rental certificate.

In some embodiments, the reward certificates are stored in the interactive apparatus in an encrypted form, and the step S45 further comprises: the server decrypting the reward certificates in the user account corresponding to the rental certificate to distribute the virtual reward corresponding to the reward certificates in the user account to the terminal device.

In summary, the virtual reward distribution system and method in the present disclosure receives the operation from the user. While the operation matches certain conditions, the virtual reward distribution system and method stores the corresponding reward into the server. After the user returns the interactive apparatus, the virtual reward distribution system and method provides the rewards to the user to improve the interactive experience. Accordingly, the virtual reward distribution system and method may provide a reward distribution function and prevent the user from not returning the interactive apparatus in the meantime.

In some embodiments, the interactive apparatus rental system and method in the first and second embodiments may combines with the virtual reward distribution system and method in the third and fourth embodiments. After the interactive apparatus rental system and/or method provides interactive apparatus rental service, the virtual reward distribution system and method determine the reward the user obtains while the user uses the interactive apparatuses. After the interactive apparatus rental system and method confirm that the interactive apparatus has been returned, the virtual reward distribution system and method distribute the reward to the user.

Figure 6:
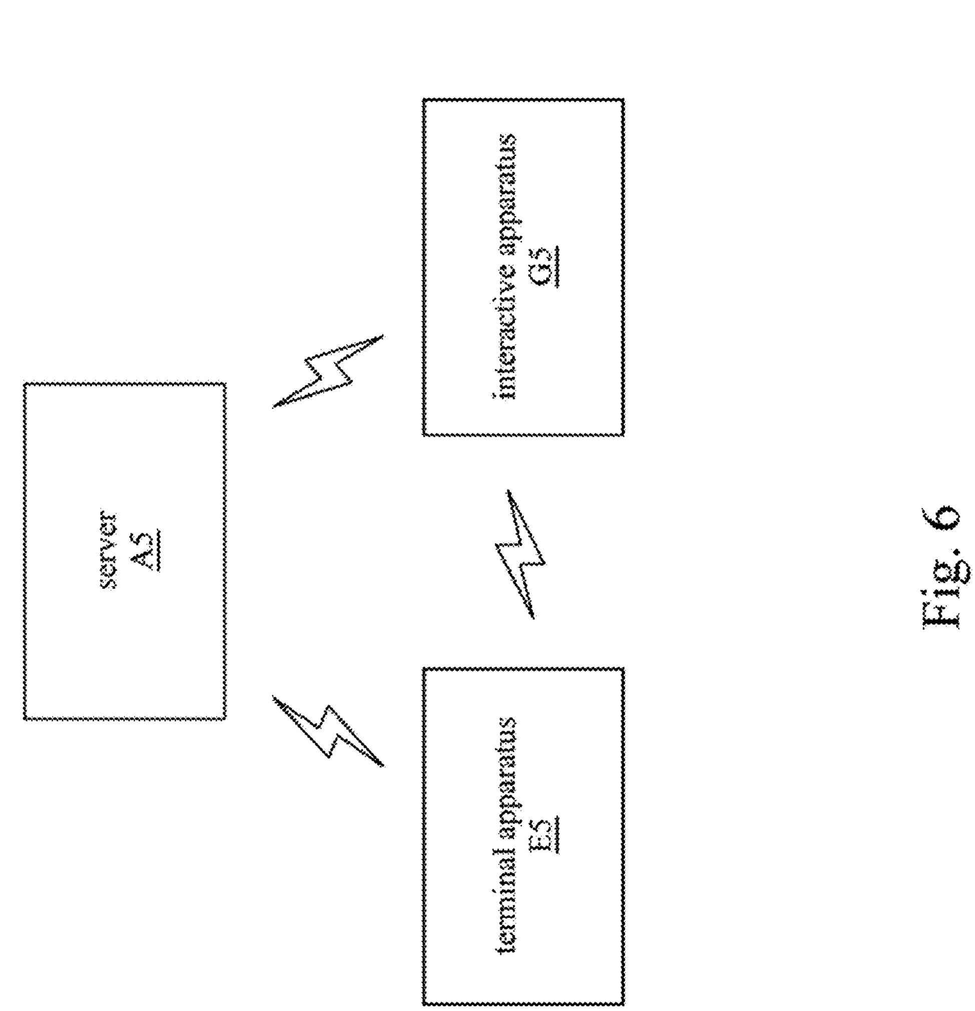
FIG. 6 is a schematic diagram illustrating an interactive apparatus positioning system communicatively connected to a terminal device according to a fifth embodiment of the present disclosure.

Please refer to FIG. 6, which is a schematic diagram illustrating an interactive apparatus positioning system 5 communicatively connected to a terminal device E5 according to a fifth embodiment of the present disclosure. The interactive apparatus positioning system 5 comprises the interactive apparatus G5 and the server A5. The interactive apparatus G5 communicatively connects to the terminal device E5. The server A5 communicatively connects to the interactive apparatus G5 and the terminal device E5 respectively.

In some embodiments, the interactive apparatus G5 may be the interactive apparatus G1 in the first embodiment or the interactive apparatus G3 in the third embodiment; the server A5 may be the server A1 in the first embodiment or the server A3 in the third embodiment; and the terminal device E5 may be the terminal device E1 in the first embodiment or the terminal device E3 in the third embodiment.

While the interactive apparatus G5 provides an interactive service, the interactive apparatus positioning system 5 confirms the location of the interactive apparatus G5 to provide the user with the corresponding interactive content or notify the user or the supplier (e.g., the provider of the interactive apparatus rental service). Details about how to locate the interactive apparatus G5 please refer to the following paragraphs.

First, the interactive apparatus G5 transmits an interactive apparatus information to the server A5, and the server A5 receives a first terminal device information from the terminal device E5. Specifically, the interactive apparatus G5 may transmit the identification of the interactive apparatus G5 (i.e., the interactive apparatus information) to the server A5, and the server A5 may receive the identification of the terminal device E5 (i.e., the first terminal device information) from the terminal device E5. The identification of the interactive apparatus G5 and the identification of the terminal device E5 are configured for the server A5 to identify the interactive apparatus G5 and the terminal device E5 respectively, wherein the identification of the interactive apparatus G5 may be an apparatus serial number, an identifier, or other information for identification, and the identification of the terminal device E5 may be a phone number, a user account number, an apparatus serial number, an identifier, or other information for identification.

Next, in response to the interactive apparatus information corresponding to the first terminal device information, the server A5 transmits an encrypted certificate to the interactive apparatus G5, and the server A5 transmits a key corresponding to the encrypted certificate to the terminal device E5. After the server A5 identifies the interactive apparatus G5 and the terminal device E5, if the interactive apparatus G5 and the terminal device E5 correspond to each other (e.g., the interactive apparatus G5 is rented by the user corresponding to the terminal device E5), the server A5 then transmits the encrypted certificate and the corresponding key to the interactive apparatus G5 and the terminal device E5, wherein the encrypted certificate can be decrypted by the key. In some embodiments, the encrypted certificate may be the rental certificate in the first embodiment and the second embodiment, a phone number, a user ID, or other encrypted information.

Next, in response to the interactive apparatus G5 being in an activated state, the interactive apparatus G5 transmits the encrypted certificate to the terminal device E5.

Specifically, while the interactive apparatus G5 is in the activated state (e.g., the interactive apparatus G5 is being used by a user), the interactive apparatus G5 transmits the encrypted certificate to the corresponding terminal device E5. In some embodiments, while the interactive apparatus G5 is in the activated state, the interactive apparatus G5 transmits the encrypted certificate to the first terminal device in every time interval (e.g., every 5 seconds).

Next, in response to receiving the encrypted certificate, the terminal device E5 decrypts the encrypted certificate with the key to obtain a decrypted certificate.

In some embodiments, the terminal device E5 further authenticate the encrypted certificate. For example, the encrypted certificate is the aforementioned rental certificate, a phone number, a user ID, or other information stored in the terminal device E5 originally, and the terminal device E5 is able to determine whether the decrypted certificate obtained after decryption is correct. If it is correct, the terminal device E5 may confirm that the encrypted certificate corresponds to the interactive apparatus G5.

Finally, in response to obtaining the decrypted certificate, the terminal device E5 transmits a location information corresponding to the terminal device E5 to the server A5 to locate the interactive apparatus G5.

In some embodiments, the interactive apparatus positioning system 5 may communicatively connects to and locates multiple sets of the terminal devicees and interactive apparatuses, the location information transmitted by the terminal device E5 may also comprise the decrypted certificate (e.g., the rental certificate, the phone number, or the user ID) and is transmitted to the server A5. After receiving the location information, the server A5 is able to determine that the location information corresponds to the terminal device E5 and the interactive apparatus G5 in the sets of the terminal devices and interactive apparatuses based on the location information.

In some embodiments, the encrypted certificate is generated after the server A5 encrypting a certificate, and the location information transmitted by the terminal device E5 comprises the decrypted certificate and is transmitted to the server A5. After receiving the location information, the server A5 is able to compare the certificate and the decrypted certificate in the location information. Accordingly, the server A5 is able to confirm that the encrypted certificate has been transmitted by the interactive apparatus G5 to the terminal device E5, and then being transmitted to the server A5 after decrypted by the terminal device E5.

In some embodiments, the location information comprises the positioning information of the terminal device E5 (e.g., the positioning information from the global positioning system). Accordingly, the server A5 may obtain the location of the terminal device E5 directly, thereby estimating or taking the location as the location of the interactive apparatus G5. In some embodiments, the location information comprises the relative location obtained by the terminal device E5 based on the communicative connection with the interactive apparatus G5. Accordingly, the server A5 is able to estimate the location of the interactive apparatus G5 based on the location of the terminal device E5.

In some embodiments, the location information also comprises a relative location information of the interactive apparatus G5 relative to the terminal device E5. For example, the terminal device E5 determines the relative location of the interactive apparatus G5 relative to the terminal device E5 based on the signal received from the interactive apparatus G5. After that, the terminal device E5 combines the relative location with the location of the terminal device E5 itself (e.g., the positioning information of the terminal device E5) to calculate the location of the interactive apparatus G5.

In some embodiments, after the terminal device E5 obtains the decrypted certificate and determines that the decrypted certificate is correct, since the decrypted certificate has been determined to be correct, the terminal device E5 may transmit the location information comprising the positioning information, wherein the location information does not comprise the decrypted certificate.

In some embodiments, if the location information does not comprise the positioning information of the terminal device E5 (e.g., the positioning information from the global positioning system), the server A5 may determine the location of the terminal device E5 based on the location information after receiving the location information. For example, when the terminal device E5 transmits the location information via the cellular network, the server is able to locate the terminal device E5 by the packet from the cellular network. Furthermore, the server A5 may estimate the location of the interactive apparatus G5 based on the location of the terminal device E5 or takes the location of the terminal device E5 as the location of the interactive apparatus G5.

It is noticed that, the interactive apparatus G5 may transmit signals to the terminal device E5 via low-power wide-area network. In addition to saving power consumption of the interactive apparatus G5, the signal transmission distance limit can also ensure that the terminal device E5 is located near the interactive apparatus G5. Accordingly, the server A5 may estimate the location of the interactive apparatus G5 based on the location of the terminal device E5 or take the location of the terminal device E5 as the location of the interactive apparatus G5.

In some embodiments, in response to the interactive apparatus G5 (also known as the second interactive apparatus in the following paragraphs) not able to communicatively connect to the terminal device E5 (also known as the second terminal device in the following paragraphs), the interactive apparatus positioning system 5 transmits a location information corresponding to the interactive apparatus G5 to the server A5 by the interactive apparatus G5.

Specifically, while the interactive apparatus G5 is not able to communicatively connect to the terminal device E5 (e.g., the interactive apparatus G5 is too far from the terminal device E5, the terminal device E5 is out of battery, or the terminal device E5 did not respond to the interactive apparatus G5 for a period of time), the interactive apparatus G5 is not able to transmit signals to the server A5 through the terminal device E5. Therefore, the interactive apparatus G5 may transmit the location information of the interactive apparatus G5 to the server A5 directly via the cellular network or other method to let the server A5 locates the interactive apparatus G5.

In some embodiments, the interactive apparatus G5 of the interactive apparatus positioning system 5 is configured to provide an interactive function (e.g., the interactive function mentioned in the first embodiment), and in response to the interactive apparatus G5 not able to communicatively connect to the terminal device E5, the interactive apparatus G5 stops providing the interactive function. In the case that the terminal device E5 cannot operate normally to assist in positioning the interactive apparatus G5, the interactive apparatus positioning system 5 is able to prevent the interactive apparatus G5 from continuously consuming power, which may lead to power exhaustion and the inability to track the position of the interactive apparatus G5, or misuse or mistaking by users not corresponding to the terminal device E5.

In some embodiments, in response to the server A5 not able to communicatively connect to the terminal device E5 (also known as the third terminal device in the following paragraphs) (e.g., the terminal device E5 did not respond to the server A5 for a period of time), the server A5 transmits a disconnected signal to the interactive apparatus G5 (also known as the third interactive apparatus in the following paragraphs); and in response to receiving the disconnected signal, the interactive apparatus G5 transmits a third location information corresponding to the interactive apparatus G5 to the server A5 to locate the interactive apparatus G5.

In some cases, the server A5 may determine that the terminal device E5 is disconnected (e.g., the interactive apparatus G5 is able to communicatively connect to the terminal device E5, but the server A5 is not able to communicatively connect to the terminal device E5), then the server A5 transmits the disconnected signal to the interactive apparatus G5 to notify the interactive apparatus G5 that the terminal device E5 has disconnected. Furthermore, after receiving the disconnected signal, the interactive apparatus G5 transmits the location information to let the server A5 to confirm the location of the interactive apparatus G5. In some embodiments, same as the aforementioned embodiments, the interactive apparatus G5 may also stop providing the interactive function.

In some embodiments, when the interactive apparatus G5 is not able to transmit the location information through the terminal device E5 and also not able to transmit the location information to the server A5 directly (e.g., if the interactive apparatus G5 cannot communicatively connect to the terminal device E5 and does not have enough power to transmit the location information to the server A5 via the cellular network), the interactive apparatus positioning system 5 may further locate the interactive apparatus G5 through other apparatus, and the detail operations please refer to the following paragraphs.

In some embodiments, the interactive apparatus positioning system 5 further comprises the interactive apparatus G51 (not shown in the figures, and also known as the fifth interactive apparatus in the following paragraphs), the interactive apparatus G51 corresponds to the terminal device E51 (not shown in the figures, and also known as the fifth terminal device in the following paragraphs), wherein the interactive apparatus G51 and the terminal device E51 may be an interactive apparatus rented by another user and a terminal device of the user respectively.

Furthermore, in response to the interactive apparatus G5 not able to communicatively connect to the terminal device E5 (also known as the fourth terminal device in the following paragraphs), the interactive apparatus G5 (also known as the fourth interactive apparatus in the following paragraphs) broadcasts a positioning signal. Specifically, the interactive apparatus G5 may broadcast the positioning signal via low-power wide-area network to allow nearby apparatuses to receive the positioning signal.

Next, in response to receiving the positioning signal, the interactive apparatus G51 transmits the location information corresponding to the interactive apparatus G5 to the server A5 or the terminal device E51 corresponding to the interactive apparatus G51. If the interactive apparatus G51 nearby the interactive apparatus G5 receives the positioning signal, the interactive apparatus G51 may transmit the location information to the corresponding the terminal device E51, wherein the location information comprises the location information of the interactive apparatus G5. Furthermore, in response to receiving the location information, the terminal device E51 transmits the location information to the server A5. Accordingly, through the operations of the interactive apparatus G51 and/or the terminal device E51, the server A5 may also confirm the location of the interactive apparatus G5.

In some embodiments, the interactive apparatus positioning system 5 further comprises the terminal device E52 (not shown in the figures, and also known as the seventh terminal device in the following paragraphs), the terminal device E52 communicatively connects to the server A5. The terminal device E52 may be a terminal device running an application corresponding to the interactive apparatus positioning system 5 (e.g., the application mentioned in the first embodiment). In some embodiments, the terminal device E52 also provides a positioning information to the server A5 through the application authorized by its user.

Similarly, in response to not able to communicatively connect to the terminal device E5 (also known as the sixth terminal device in the following paragraphs), the interactive apparatus G5 (also known as the sixth interactive apparatus in the following paragraphs) broadcasts a positioning signal.

Furthermore, in response to receiving the positioning signal broadcasted by the interactive apparatus G5, the terminal device E52 transmits the location information corresponding to the interactive apparatus G5 to the server A5.

In some embodiments, the interactive apparatus positioning system 5 transmits the location information of the interactive apparatus G5 to the server A5 through a communication route formed by at least one node, wherein the communication route starts from the interactive apparatus G5 and ends at the server A5. In other words, the signal starts from the interactive apparatus G5, passes at least one node, and finally received by the server A5, and the server A5 is able to locate the interactive apparatus G5 based on the signal received. Please refer to FIG. 7, which is a schematic diagram illustrating the interactive apparatus positioning system 5 locating the interactive apparatus G5 (also known as the seventh interactive apparatus in the following paragraphs) through node apparatuses N1 and N2 and a last node apparatus LN according to a fifth embodiment of the present disclosure.

In this embodiment, the interactive apparatus positioning system 5 further comprises the node apparatuses N1 and N2 and the last node apparatus LN. The last node apparatus LN communicatively connects to the server A5. The last node apparatus LN communicatively connects to the server A5 via a network, and the last node apparatus LN may connects to the server A5 via the internet, the cellular network, or other communication method. For example, the rental apparatus mentioned in the first and second embodiments, the interactive apparatus with sufficient power, and the terminal device running the application authorized by the user to provide the positioning information to the server A5. On the other hand, the node apparatuses N1 and N2 may be interactive apparatuses that do not have enough power to transmit the location information to the server A5 via the cellular network and/or terminal devicees running applications not authorized by the user to provide the positioning information to the server A5.

Figure 7:
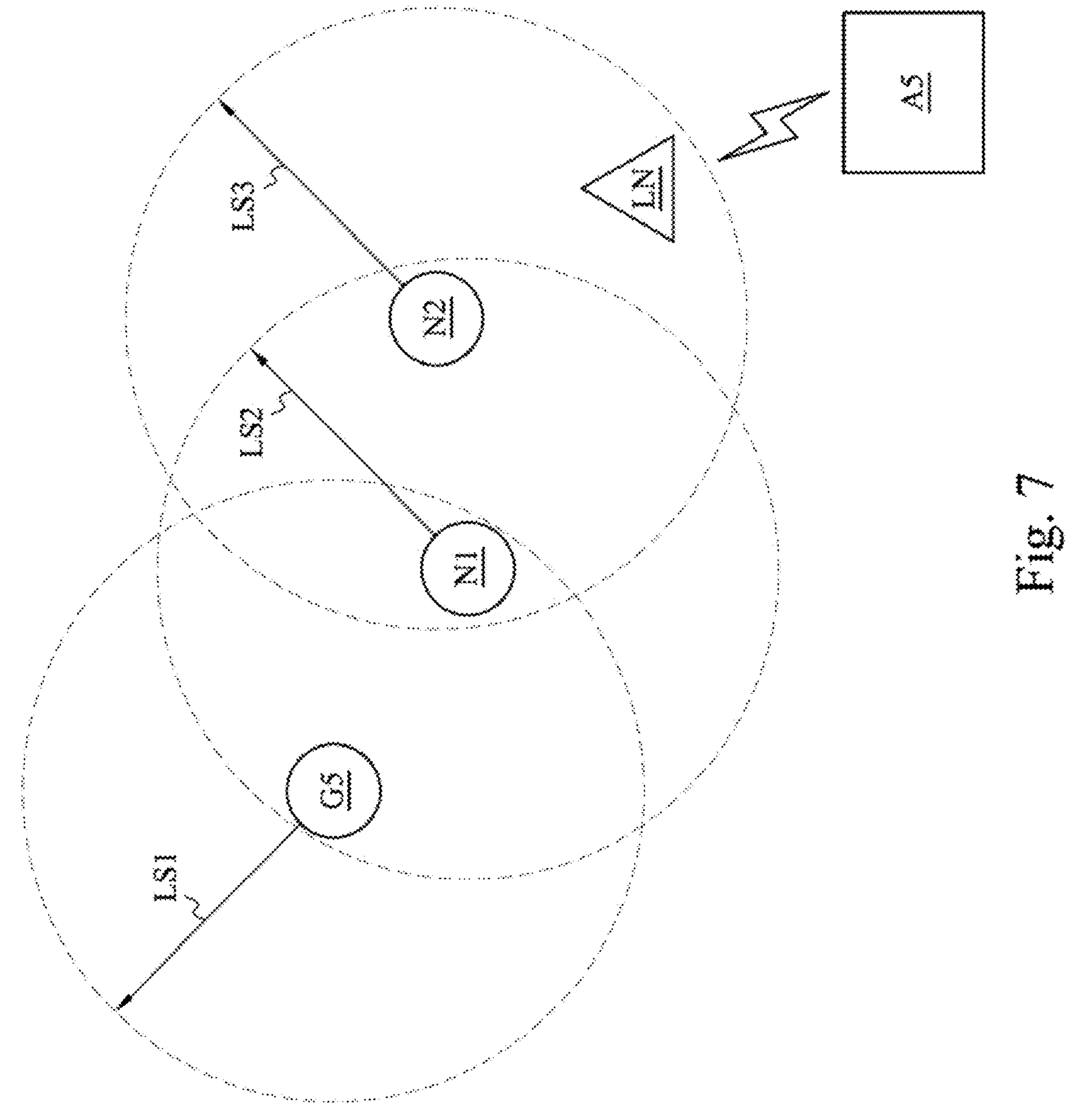
FIG. 7 is a schematic diagram illustrating the interactive apparatus positioning system locating the interactive apparatus through node apparatuses and a last node apparatus according to a fifth embodiment of the present disclosure.

As shown in FIG. 7, after the interactive apparatus G5 broadcasts a positioning signal LS1 (i.e., the positioning signal in the aforementioned embodiments), in response to receiving the positioning signal LS1, the node apparatus N1 nearby broadcasts the positioning signal LS2, wherein the positioning signal LS2 comprises a first relative location information corresponding to the positioning signal LS1, and the first relative location information is configured to indicate the direction and/or distance of the interactive apparatus G5 relative to the node apparatus N1 (e.g., 3 meters to the east). The first relative location information may be a vector calculated by the node apparatus N1 determining the direction and/or distance of the source of the positioning signal LS1 based on the signal direction and/or strength of the positioning signal LS1, wherein the vector comprises a direction and/or a distance.

Similarly, after receiving the positioning signal LS2 broadcasted by the node apparatus N1, the node apparatus N2 broadcasts the positioning signal LS3, wherein the positioning signal LS3 comprises the first relative location information corresponding to the positioning signal LS1 and a second relative location information corresponding to the positioning signal LS2. Same as the node apparatus N1, the node apparatus N2 calculates the second relative location information corresponding to the positioning signal LS2 based on the positioning signal LS2, and the detail will not be repeated for brevity.

Furthermore, in response to receiving the positioning signal LS3, the last node apparatus LN transmits the location information corresponding to the interactive apparatus G5 to the server A5.

After receiving the positioning signal LS3, similarly, the last node apparatus LN may obtain a third relative location information corresponding to the positioning signal LS3 based on the positioning signal LS3 and combine the location of the last node apparatus LN itself and the first relative location information and the second relative location information in the positioning signal LS3 to calculate the location information of the interactive apparatus G5. For example, the last node apparatus LN subtracts the vector of the first relative location information, the vector of the second relative location information, and the vector of the third relative location information from the coordinate of the last node apparatus LN to obtain the coordinate of the interactive apparatus G5.

Furthermore, the last node apparatus LN transmits the location information of the interactive apparatus G5 calculated to the server A5 to let the server A5 confirm the location of the interactive apparatus G5.

It is noticed that, FIG. 7 is only for illustration for brevity, the interactive apparatus positioning system 5 may comprises other numbers of node apparatuses practically. After receiving a positioning signal, the node apparatus obtains the relative location information corresponding to the positioning signal through calculation and then broadcasts another positioning signal, wherein the positioning signal broadcasted comprises the relative location information calculated and the relative location information corresponding to other positioning signals. On the other hand, after receiving a positioning signal, the last node apparatus LN obtains the relative location information corresponding to the positioning signal through calculation, then calculates the interactive apparatus location based on the its own location, the relative location information calculated, and the relative location information in the positioning signal, and finally transmits the location information of the interactive apparatus to the server to locate the interactive apparatus.

In some embodiments, if the node apparatus receives multiple positioning signals from the same interactive apparatus (e.g., the node apparatus N2 receives the positioning signal LS1 and the positioning signal LS2 from the interactive apparatus G5 in FIG. 7), the node apparatus will only broadcasts another positioning signal based on one of the positioning signals received to prevent the interactive apparatus positioning system 5 from misjudging the number of the interactive apparatuses needs to be located.

In some embodiments, the interactive apparatus (e.g., the interactive apparatus G5) of the interactive apparatus positioning system 5 also comprises multiple antennas. When the interactive apparatus transmits multiple signals via the antennas, a receiving apparatus is able to receive the signals and generate a relative positioning signal based on the signals, wherein the receiving apparatus may be the aforementioned node apparatus, terminal device, interactive apparatus and/or other apparatus able to receive signals from the interactive apparatus. For example, the receiving apparatus calculates the location of the interactive apparatus related to the receiving apparatus (i.e., the relative positioning signal) based on the angles of departure (AoD) of the signals. Additionally, the receiving apparatus combine the relative location and its own location information to obtain the location of the interactive apparatus. The receiving apparatus may transmits the location of the interactive apparatus to other apparatus (e.g., the server A5) or transmits the relative location to other apparatus (e.g., the node apparatuses N1, N2, or the last node apparatus LN) directly. Accordingly, the interactive apparatus positioning system 5 does not require three or more apparatuses, and only an interactive apparatus and a receiving apparatus are needed to locate the interactive apparatus and the method is able to be applied to the operations of the aforementioned interactive apparatus positioning system 5.

It is noticed that, the embodiments of the interactive apparatus positioning system 5 locating the interactive apparatus G5 by using different methods are used for illustration. In practical, the interactive apparatus positioning system 5 may comprise multiple interactive apparatuses, and the interactive apparatus positioning system 5 locates the interactive apparatuses based on various scenarios of each of the interactive apparatuses (e.g., whether having sufficient power, whether able to communicatively connect to the terminal device). Namely, the interactive apparatus positioning system 5 may locate all of the interactive apparatuses by using the same method or locate the interactive apparatuses by using all or part of the methods respectively.

Figure 8:
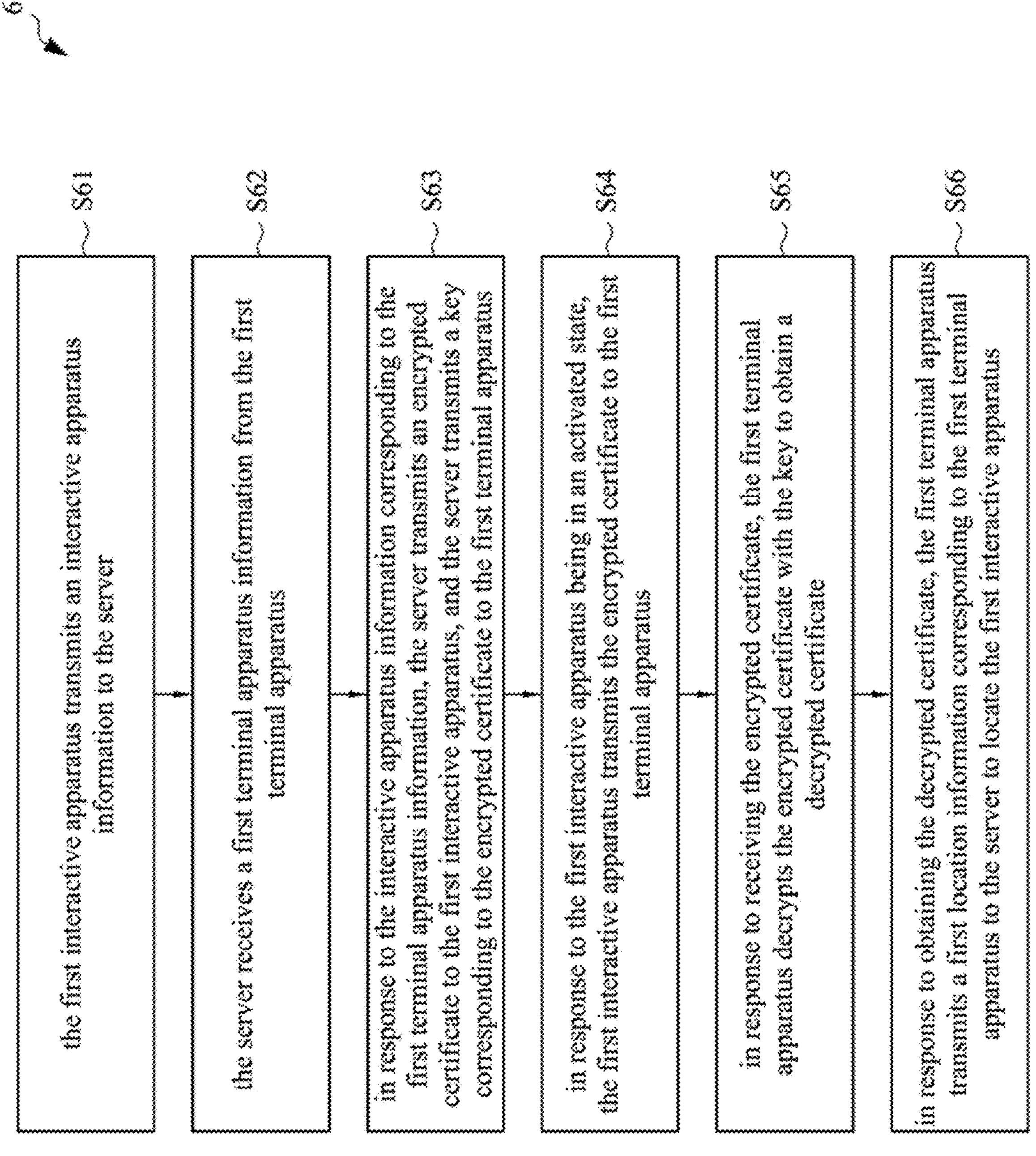
FIG. 8 is a flow diagram illustrating an interactive apparatus positioning method according to a sixth embodiment of the present disclosure.

Please further refer to FIG. 8, which is a flow diagram illustrating an interactive apparatus positioning method 6 according to a sixth embodiment of the present disclosure. The interactive apparatus positioning method 6 comprises steps S61-S66. The interactive apparatus positioning method 6 is adapted for use in an interactive apparatus positioning system (e.g., the interactive apparatus positioning system 5). The interactive apparatus positioning system comprises a first interactive apparatus (e.g., the interactive apparatus G5) and a server (e.g., the server A5), wherein the first interactive apparatus communicatively connects to a first terminal device, and the server communicatively connects to the first interactive apparatus and the first terminal device.

In the step S61, the first interactive apparatus transmits an interactive apparatus information to the server.

In the step S62, the server receives a first terminal device information from the first terminal device.

In the step S63, in response to the interactive apparatus information corresponding to the first terminal device information, the server transmits an encrypted certificate to the first interactive apparatus, and the server transmits a key corresponding to the encrypted certificate to the first terminal device.

In the step S64, in response to the first interactive apparatus being in an activated state, the first interactive apparatus transmits the encrypted certificate to the first terminal device.

In the step S65, in response to receiving the encrypted certificate, the first terminal device decrypts the encrypted certificate with the key to obtain a decrypted certificate.

In the step S66, in response to obtaining the decrypted certificate, the first terminal device transmits a first location information corresponding to the first terminal device to the server to locate the first interactive apparatus.

In some embodiments, the interactive apparatus positioning method 6 further comprises in response to the first interactive apparatus being in an activated state, the first interactive apparatus transmitting the encrypted certificate to the first terminal device in every time interval.

In some embodiments, the interactive apparatus positioning system further comprises a second interactive apparatus, the second interactive apparatus corresponds to a second terminal device, and the interactive apparatus positioning method 6 further comprises in response to the second interactive apparatus not able to communicatively connect to the second terminal device, the second interactive apparatus transmitting a second location information corresponding to the second interactive apparatus to the server to locate the second interactive apparatus.

In some embodiments, the first interactive apparatus is configured to provide an interactive function, and the interactive apparatus positioning method 6 further comprises in response to the first interactive apparatus not able to communicatively connect to the first terminal device, the first interactive apparatus stopping providing the interactive function.

In some embodiments, the interactive apparatus positioning system further comprises a third interactive apparatus, the third interactive apparatus corresponds to a third terminal device, and the interactive apparatus positioning method 6 further comprises in response to the server not able to communicatively connect to the third terminal device, the server transmitting a disconnected signal to the third interactive apparatus; and in response to receiving the disconnected signal, the third interactive apparatus transmitting a third location information corresponding to the third interactive apparatus to the server to locate the third interactive apparatus.

In some embodiments, the third interactive apparatus is configured to provide an interactive function, and the interactive apparatus positioning method 6 further comprises in response to receiving the disconnected signal, the third interactive apparatus stopping providing the interactive function.

In some embodiments, the interactive apparatus positioning system further comprises a fourth interactive apparatus and a fifth interactive apparatus, the fourth interactive apparatus corresponds to a fourth terminal device, the fifth interactive apparatus corresponds to a fifth terminal device, and the interactive apparatus positioning method 6 further comprises in response to the fourth interactive apparatus not able to communicatively connect to the fourth terminal device, the fourth interactive apparatus broadcasting a positioning signal; in response to receiving the positioning signal, the fifth interactive apparatus transmitting a fourth location information corresponding to the fourth interactive apparatus to the fifth terminal device corresponding to the fifth interactive apparatus; and in response to receiving the fourth location information, the fifth terminal device transmitting the fourth location information to the server to let the server locate the fourth interactive apparatus.

In some embodiments, the interactive apparatus positioning system further comprises a sixth interactive apparatus, the sixth interactive apparatus corresponds to a sixth terminal device, and the interactive apparatus positioning method 6 further comprises in response to the sixth interactive apparatus not able to communicatively connect to the sixth terminal device, the sixth interactive apparatus broadcasting a positioning signal; and the server receiving a sixth location information corresponding to the sixth interactive apparatus from a seventh terminal device to locate the sixth interactive apparatus, wherein the sixth location information is transmitted in response to the seventh terminal device receiving the positioning signal.

In some embodiments, the interactive apparatus positioning system further comprises a seventh interactive apparatus and a final node apparatus, the final node apparatus communicatively connects to the server via a network, and the interactive apparatus positioning method 6 further comprises the final node apparatus obtaining at least one relative location information based on a positioning signal received on a communication route from the seventh interactive apparatus to the server; the final node apparatus obtaining a seventh location information corresponding to the seventh interactive apparatus based on the at least one relative location information; and the final node apparatus transmitting the seventh location information corresponding to the seventh interactive apparatus to the server to locate the seventh interactive apparatus.

In some embodiments, the interactive apparatus positioning system further comprises a first node apparatus, the seventh interactive apparatus corresponds to a seventh terminal device, and the interactive apparatus positioning method 6 further comprises in response to the seventh interactive apparatus not able to communicatively connect to the seventh terminal device, the seventh interactive apparatus broadcasting a first positioning signal; in response to receiving the first positioning signal, the first node apparatus calculating a first relative location information corresponding to the first positioning signal; and the first node apparatus broadcasting a second positioning signal, wherein the second positioning signal comprises the first relative location information.

In some embodiments, the interactive apparatus positioning system further comprises a second node apparatus, and the interactive apparatus positioning method 6 further comprises in response to receiving the second positioning signal, the second node apparatus calculating a second relative location information corresponding to the second positioning signal; and the second node apparatus broadcasting a third positioning signal, wherein the third positioning signal comprises the first relative location information and the second relative location information.

In some embodiments, the first interactive apparatus further comprises a plurality of antennas, and the interactive apparatus positioning method further comprises the antennas transmitting a positioning signal to a receiving apparatus, wherein the receiving apparatus is located on a communication route from the first interactive apparatus to the server; the receiving apparatus generating a relative positioning signal based on the positioning signal; and the server locating the first interactive apparatus based on the relative positioning signal.

In summary, the interactive apparatus positioning system and method provided in the fifth and sixth embodiments are able to locate an interactive apparatus. In addition, even the terminal device is disconnected, and/or the interactive apparatus is low on battery, the interactive apparatus positioning system and method are also able to allow the server to confirm the location of the interactive apparatus and then notify personnel to collect the interactive device at a specific location to reduce the risk of losing the interactive device.

In some embodiments, the interactive apparatus rental system and method, the virtual reward distribution system and method, and the interactive apparatus positioning system and method may operate simultaneously and operate together.

For example, after the interactive apparatus rental system and/or method rents an interactive apparatus to a user, the interactive apparatus positioning system and/or method is able to confirm the location of the interactive apparatus, and the virtual reward distribution system and/or method determines the reward obtained by the user simultaneously. Furthermore, after the interactive apparatus rental system and/or method confirms that the interactive apparatus has been returned, the virtual reward distribution system and/or method distributes the reward to the user, and the interactive apparatus positioning system and/or method stops locating the interactive apparatus. Accordingly, the aforementioned systems and/or methods are able to provide the interactive apparatus rental service, improve the interactive experience, and locate the interactive apparatus.

It is noticed that, the present disclosure is not limited to the combination above. The present disclosure may also be operated by combining the interactive apparatus rental system and/or method and the interactive apparatus positioning system and/or method, or be operated by combining the virtual reward distribution system and/or method and the interactive apparatus positioning system and/or method, and the detail will not be repeated for brevity.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An interactive apparatus positioning system, comprising:

a first interactive apparatus, communicatively connected to a first terminal device; and a server, communicatively connected to the first interactive apparatus and the first terminal device;

wherein the interactive apparatus positioning system is configured to execute the following operations:

transmitting, by the first interactive apparatus, an interactive apparatus information to the server;

receiving, by the server, a first terminal device information from the first terminal device;

in response to the interactive apparatus information corresponding to the first terminal device information, transmitting, by the server, an encrypted certificate to the first interactive apparatus, and transmitting, by the server, a key corresponding to the encrypted certificate to the first terminal device;

in response to the first interactive apparatus being in an activated state, transmitting, by the first interactive apparatus, the encrypted certificate to the first terminal device; and receiving, by the server, a first location information corresponding to the first terminal device from the first terminal device to locate the first interactive apparatus, wherein the first location information is transmitted in response to the first terminal device receiving the encrypted certificate and obtaining a decrypted certificate by decrypting the encrypted certificate with the key, wherein the first interactive apparatus is configured to provide an interactive function, and the interactive apparatus positioning system is further configured to execute the following operation:

in response to the first interactive apparatus not being able to communicatively connect to the first terminal device, stopping, by the first interactive apparatus, providing the interactive function.

2. The interactive apparatus positioning system of claim 1, wherein the interactive apparatus positioning system further configured to execute the following operation:

in response to the first interactive apparatus being in an activated state, transmitting, by the first interactive apparatus, the encrypted certificate to the first terminal device in every time interval.

3. The interactive apparatus positioning system of claim 1, further comprising:

a second interactive apparatus, corresponding to a second terminal device;

wherein the interactive apparatus positioning system is further configured to execute the following operation:

in response to the second interactive apparatus not being able to communicatively connect to the second terminal device, transmitting, by the second interactive apparatus, a second location information corresponding to the second interactive apparatus to the server to locate the second interactive apparatus.

4. The interactive apparatus positioning system of claim 1, further comprising:

a third interactive apparatus, corresponding to a third terminal device;

wherein the interactive apparatus positioning system is further configured to execute the following operations:

in response to the server not being able to communicatively connect to the third terminal device, transmitting, by the server, a disconnected signal to the third interactive apparatus; and in response to receiving the disconnected signal, transmitting, by the third interactive apparatus, a third location information corresponding to the third interactive apparatus to the server to locate the third interactive apparatus.

5. The interactive apparatus positioning system of claim 4, wherein the third interactive apparatus is configured to provide an interactive function, and the interactive apparatus positioning system is further configured to execute the following operation:

in response to receiving the disconnected signal, stopping, by the third interactive apparatus, providing the interactive function.

6. The interactive apparatus positioning system of claim 1, further comprising:

a fourth interactive apparatus, corresponding to a fourth terminal device; and a fifth interactive apparatus, corresponding to a fifth terminal device; wherein the interactive apparatus positioning system is further configured to execute the following operations:

in response to the fourth interactive apparatus not being able to communicatively connect to the fourth terminal device, broadcasting, by the fourth interactive apparatus, a positioning signal;

in response to receiving the positioning signal, transmitting, by the fifth interactive apparatus, a fourth location information corresponding to the fourth interactive apparatus to the fifth terminal device corresponding to the fifth interactive apparatus; and in response to receiving the fourth location information, transmitting, by the fifth terminal device, the fourth location information to the server to let the server locate the fourth interactive apparatus.

7. The interactive apparatus positioning system of claim 1, further comprising:

a sixth interactive apparatus, corresponding to a sixth terminal device;

wherein the interactive apparatus positioning system is further configured to execute the following operations:

in response to the sixth interactive apparatus not being able to communicatively connect to the sixth terminal device, broadcasting, by the sixth interactive apparatus, a positioning signal; and receiving, by the server, a sixth location information corresponding to the sixth interactive apparatus from a seventh terminal device to locate the sixth interactive apparatus, wherein the sixth location information is transmitted in response to the seventh terminal device receiving the positioning signal.

8. The interactive apparatus positioning system of claim 1, further comprising:

a seventh interactive apparatus; and a final node apparatus, communicatively connected to the server via a network;

wherein the final node apparatus is further configured to execute the following operations:

obtaining at least one relative location information based on a positioning signal received on a communication route from the seventh interactive apparatus to the server;

obtaining a seventh location information corresponding to the seventh interactive apparatus based on the at least one relative location information; and transmitting the seventh location information corresponding to the seventh interactive apparatus to the server to locate the seventh interactive apparatus.

9. The interactive apparatus positioning system of claim 8, further comprising a first node apparatus, wherein the seventh interactive apparatus corresponds to a seventh terminal device, and the interactive apparatus positioning system is further configured to execute the following operations:

in response to the seventh interactive apparatus not being able to communicatively connect to the seventh terminal device, broadcasting, by the seventh interactive apparatus, a first positioning signal;

in response to receiving the first positioning signal, calculating, by the first node apparatus, a first relative location information corresponding to the first positioning signal; and broadcasting, by the first node apparatus, a second positioning signal, wherein the second positioning signal comprises the first relative location information.

10. The interactive apparatus positioning system of claim 9, further comprising a second node apparatus, wherein the interactive apparatus positioning system is further configured to execute the following operations:

in response to receiving the second positioning signal, calculating, by the second node apparatus, a second relative location information corresponding to the second positioning signal; and broadcasting, by the second node apparatus, a third positioning signal, wherein the third positioning signal comprises the first relative location information and the second relative location information.

11. The interactive apparatus positioning system of claim 1, wherein the first interactive apparatus further comprises a plurality of antennas, and the interactive apparatus positioning system is further configured to execute the following operations:

transmitting, by the antennas, a positioning signal to a receiving apparatus, wherein the receiving apparatus is located on a communication route from the first interactive apparatus to the server;

generating, by the receiving apparatus, a relative positioning signal based on the positioning signal; and locating, by the server, the first interactive apparatus based on the relative positioning signal.

12. An interactive apparatus positioning method, being adapted for use in an interactive apparatus positioning system, wherein the interactive apparatus positioning system comprises a first interactive apparatus and a server, the first interactive apparatus communicatively connects to a first terminal device, the server communicatively connects to the first interactive apparatus and the first terminal device, and the interactive apparatus positioning method comprises the following steps:

transmitting, by the first interactive apparatus, an interactive apparatus information to the server;

receiving, by the server, a first terminal device information from the first terminal device;

in response to the interactive apparatus information corresponding to the first terminal device information, transmitting, by the server, an encrypted certificate to the first interactive apparatus, and transmitting, by the server, a key corresponding to the encrypted certificate to the first terminal device;

in response to the first interactive apparatus being in an activated state, transmitting, by the first interactive apparatus, the encrypted certificate to the first terminal device; and receiving, by the server, a first location information corresponding to the first terminal device from the first terminal device to locate the first interactive apparatus, wherein the first location information is transmitted in response to the first terminal device receiving the encrypted certificate and obtaining a decrypted certificate by decrypting the encrypted certificate with the key, wherein the first interactive apparatus is configured to provide an interactive function, and the interactive apparatus positioning method further comprises:

in response to the first interactive apparatus not being able to communicatively connect to the first terminal device, stopping, by the first interactive apparatus, providing the interactive function.

13. The interactive apparatus positioning method of claim 12, further comprising:

in response to the first interactive apparatus being in an activated state, transmitting, by the first interactive apparatus, the encrypted certificate to the first terminal device in every time interval.

14. The interactive apparatus positioning method of claim 12, wherein the interactive apparatus positioning system further comprises a second interactive apparatus, the second interactive apparatus corresponds to a second terminal device, and the interactive apparatus positioning method further comprises:

in response to the second interactive apparatus not being able to communicatively connect to the second terminal device, transmitting, by the second interactive apparatus, a second location information corresponding to the second interactive apparatus to the server to locate the second interactive apparatus.

15. The interactive apparatus positioning method of claim 12, wherein the interactive apparatus positioning system further comprises a third interactive apparatus, the third interactive apparatus corresponds to a third terminal device, and the interactive apparatus positioning method further comprises:

in response to the server not being able to communicatively connect to the third terminal device, transmitting, by the server, a disconnected signal to the third interactive apparatus; and in response to receiving the disconnected signal, transmitting, by the third interactive apparatus, a third location information corresponding to the third interactive apparatus to the server to locate the third interactive apparatus.

16. The interactive apparatus positioning method of claim 12, wherein the interactive apparatus positioning system further comprises a fourth interactive apparatus and a fifth interactive apparatus, the fourth interactive apparatus corresponds to a fourth terminal device, the fifth interactive apparatus corresponds to a fifth terminal device, and the interactive apparatus positioning method further comprises:

in response to the fourth interactive apparatus not being able to communicatively connect to the fourth terminal device, broadcasting, by the fourth interactive apparatus, a positioning signal;

in response to receiving the positioning signal, transmitting, by the fifth interactive apparatus, a fourth location information corresponding to the fourth interactive apparatus to the fifth terminal device corresponding to the fifth interactive apparatus; and in response to receiving the fourth location information, transmitting, by the fifth terminal device, the fourth location information to the server to let the server locate the fourth interactive apparatus.

17. The interactive apparatus positioning method of claim 12, wherein the interactive apparatus positioning system further comprises a seventh interactive apparatus and a final node apparatus, the final node apparatus communicatively connects to the server via a network, and the interactive apparatus positioning method further comprises:

obtaining, by the final node apparatus, at least one relative location information based on a positioning signal received on a communication route from the seventh interactive apparatus to the server;

obtaining, by the final node apparatus, a seventh location information corresponding to the seventh interactive apparatus based on the at least one relative location information; and transmitting, by the final node apparatus, the seventh location information corresponding to the seventh interactive apparatus to the server to locate the seventh interactive apparatus.

18. The interactive apparatus positioning method of claim 12, wherein the first interactive apparatus further comprises a plurality of antennas, and the interactive apparatus positioning method further comprises:

transmitting, by the antennas, a positioning signal to a receiving apparatus, wherein the receiving apparatus is located on a communication route from the first interactive apparatus to the server;

generating, by the receiving apparatus, a relative positioning signal based on the positioning signal; and locating, by the server, the first interactive apparatus based on the relative positioning signal.

* * * * *